United States Patent [19]
McClure

[11] Patent Number: 5,400,007
[45] Date of Patent: Mar. 21, 1995

[54] MULTIPLE LEVEL PARALLEL MAGNITUDE COMPARATOR

[75] Inventor: David C. McClure, Carrollton, Tex.

[73] Assignee: SGS-Thomson Microelectronics, Inc., Carrollton, Tex.

[21] Appl. No.: 20,045

[22] Filed: Feb. 19, 1993

Related U.S. Application Data

[63] Continuation-in-part of Ser. No. 876,959, Apr. 30, 1992, Pat. No. 5,357,235.

[51] Int. Cl.$^6$ .............................................. G06F 7/02
[52] U.S. Cl. ..................... 340/146.2; 327/64
[58] Field of Search ................ 340/146.2; 307/355

[56] References Cited

U.S. PATENT DOCUMENTS

| | | | |
|---|---|---|---|
| 4,163,211 | 7/1979 | Miura | 340/146.2 |
| 5,130,692 | 7/1992 | Ando et al. | 340/146.2 |
| 5,274,835 | 12/1993 | Wakatani | 340/146.2 |

FOREIGN PATENT DOCUMENTS

| | | |
|---|---|---|
| 0568373 | 11/1993 | European Pat. Off. . |
| 0347029 | 12/2089 | European Pat. Off. . |
| 1603654 | 5/1971 | France . |

OTHER PUBLICATIONS

Electronic Engineering, J. Daniels, "Circuits for Fast Binary Addition", vol. 62, No. 760, Apr. 1990, p. 27–28.

Primary Examiner—Margaret Rose Wambach
Attorney, Agent, or Firm—Renee M. Larson; Lisa K. Jorgenson; Richard K. Robinson

[57] ABSTRACT

A magnitude comparator is modified to compare the magnitudes of two large binary values more quickly and with minimum gate delays. Bit comparators are divided into groups which generate compare output signals in parallel to one another, thereby reducing magnitude comparator delay. These compare output signals are fed into a control element which determines which compare output signal is allowed to pass through as the final compare output signal. This circuitry, along with logic circuitry which indicates whether corresponding bit values within associated groups exactly match, defines a magnitude comparator block. Multiple magnitude blocks are used to facilitate the comparison of larger binary values. Each magnitude comparator block generates a compare output signal which, in turn, is an input to a corresponding gating element. Each gating element possesses a logic input signal, derived in part from its magnitude comparator block's match logic circuitry. The gating element logic input signals ensure that only the compare output signal of the magnitude comparator block having the highest order bits with magnitude difference will be allowed to propagate through as the final compare output signal.

33 Claims, 3 Drawing Sheets

MULTIPLE LEVEL PARALLEL MAGNITUDE COMPARATOR

CROSS REFERENCE TO RELATED APPLICATIONS

This application is a continuation-in-part of U.S. Ser. No. 07/876,959, filed Apr. 30, 1992, and entitled "Parallelized Magnitude Comparator", now U.S. Pat. No. 5,357,235.

The subject matter of this parent application (U.S. Ser. No. 07/876,959, filed Apr. 30, 1992 and entitled "Parallelized Magnitude Comparator") is related to copending U.S. application Ser. No. 07/860,981, filed Mar. 31, 1992 now abandoned, titled "Parallelized Borrow Look Ahead Subtractor", and copending U.S. application Ser. No. 07/876,851, filed Apr. 30, 1992 now U.S. Pat. No. 5,319,347, titled "Parallelized Magnitude Comparator For Comparing A Binary Number to a Fixed Value", both assigned to the assignee hereof, and both of which are herein incorporated by reference.

BACKGROUND OF THE INVENTION

1. Field of the Invention

The present invention relates generally to integrated circuits, and more specifically to a multiple level magnitude comparator circuit.

2. Description of the Prior Art

Magnitude comparator circuits are used when it is necessary to determine the relationship between the magnitude of two numbers—whether a number is equal to, less than, or greater than another number in magnitude. Such circuits find a wide variety of uses in the electronics industry. For example, magnitude comparators are used in conjunction with subtractors to generate high speed flag logic for FIFO (First In First Out) memories. Magnitude comparator circuits are also used in arithmetic logic units (ALU's) found in personal computers (PCs) and other computers and by microprocessors for the execution of certain instructions.

Serial magnitude comparators are a common form of comparator circuits in the prior art. They have a number of individual bit comparators that together serially determine the magnitude of a number relative to another number. First, the least significant bits (LSBs) of the two numbers are compared before comparing the next bits, the LSB+1. This process continues serially until the most significant bits (MSBs) have been compared. The serial process can be quite consuming; at least 16 gate delays will be incurred for comparing two 16 bit words.

The individual bit comparators which comprise a serial magnitude comparator have four inputs: two inputs determined by the two bits to be compared, an input from the compare output of the previous magnitude comparator, and an input equal to the first bit of the two bits being compared. The compare output of a bit comparator is input to the subsequent bit comparator and reflects whether the magnitude of one bit is equal to, less than, or greater than the magnitude of the second bit. If the two bits being compared are equal, then the compare input is passed through the bit comparator as the compare output. If, however, the two bits are unequal in magnitude, then the input equal to the first bit of the two bits being compared is passed through as the compare output. This comparison process starts with the least significant bit (LSB) comparator and continues until the most significant bit (MSB) comparator finishes its comparison operation. The bit comparator with the highest order bit of difference determines the state of the final compare output.

The gate delays associated with serial magnitude comparators can have an adverse effect on overall system performance. This is especially the case when the magnitude of two large binary numbers must be determined. Several technologies, such as processors, video chips, image processing, and content addressable memories (CAMs), process large amounts of data and therefore compare large binary numbers. A fundamental way to enhance the speed at which FIFO flag logic is generated is to minimize propagation and gate delays associated with serial magnitude comparators. This approach is equally valid for those applications which compare large binary numbers. It would be desirable to accomplish this using current magnitude comparator design.

SUMMARY OF THE INVENTION

A magnitude comparator is modified to compare the magnitudes of two large binary values more quickly and with minimum gate delays. Bit comparators are divided into groups which generate compare output signals in parallel to one another, thereby reducing magnitude comparator delay. These compare output signals are fed into a control element which determines which compare output signal is allowed to pass through as the final compare output signal. This circuitry, along with logic circuitry which indicates whether corresponding bit values within associated groups exactly match, defines a magnitude comparator block.

Multiple magnitude blocks are used to facilitate the comparison of larger binary values. Each magnitude comparator block generates a compare output signal which, in turn, is an input to a corresponding gating element. Each gating element possesses a logic input signal, derived in part from its magnitude comparator block's match logic circuitry. The gating element logic input signals ensure that only the compare output signal of the magnitude comparator block having the highest order bits with magnitude difference will be allowed to propagate through as the final compare output signal.

BRIEF DESCRIPTION OF THE DRAWINGS

The novel features believed characteristic of the invention are set forth in the appended claims. The invention itself however, as well as a preferred mode of use, and further objects and advantages thereof, will best be understood by reference to the following detailed description of an illustrative embodiment when read in conjunction with the accompanying drawings, wherein:

DESCRIPTION OF THE PREFERRED EMBODIMENT

A FIFO is a First In First Out memory typically used in prior art applications between machines which use data at different rates of speed: for instance, between a computer and a printer. The FIFO memory outputs its status through the use of a flag. Comparators are frequently used in FIFO memory circuits in conjunction with subtractors to generate FIFO flags. The flag outputs indicate that the FIFO is full, half full, and empty, for instance. In order to determine FIFO status, it is necessary to keep track of how many bits have been written in and how many bits have been read out of the FIFO. Also, it is necessary to know the relationship between the magnitude of two numbers and whether the magnitude of one number is equal to, less than, or greater than the magnitude of the second number. Comparing the magnitude of these numbers is accomplished through the use of a magnitude comparator circuit inside the FIFO.

Figure 1:
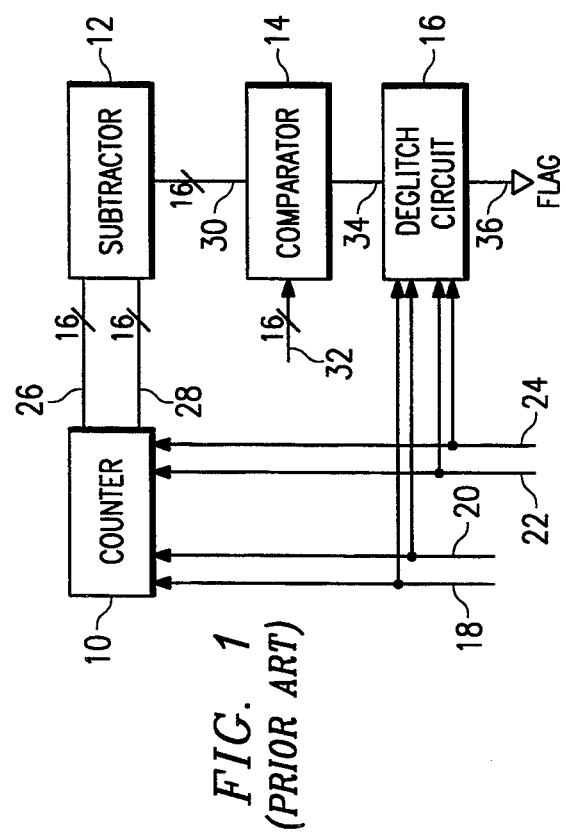
FIG. 1 is a block diagram of a FIFO flag generation circuit according to the prior art.

Referring to FIG. 1, a block diagram of a FIFO Flag generation circuit according to the prior art is shown. The FIFO Flag has a counter block 10, a subtractor block 12, a comparator block 14, and a deglitch block 16. The write clock 18, the read clock 20, the write reset clock 22, and the read reset clock 24 are input signals to both the counter block 10 and the deglitch block 16. The counter block 10 takes these input signals and generates a write count 26 and a read count 28 which are input to the subtractor block 12 which in turn outputs a difference signal 30. This difference signal 30 and a program value 32 are input to the comparator block 14 which compares them in order to generate an output compare signal 34. As is well known in the art, the program value 32 is set to different values depending on the type of flag signal 36, such as empty, half full, or full, to be generated. Finally, the compare signal 34 as well as the write clock 18, the read clock 20, the write reset clock 22, and the read reset clock 24 are input to the deglitch block 36 which generates a flag output signal 36.

Figure 2:
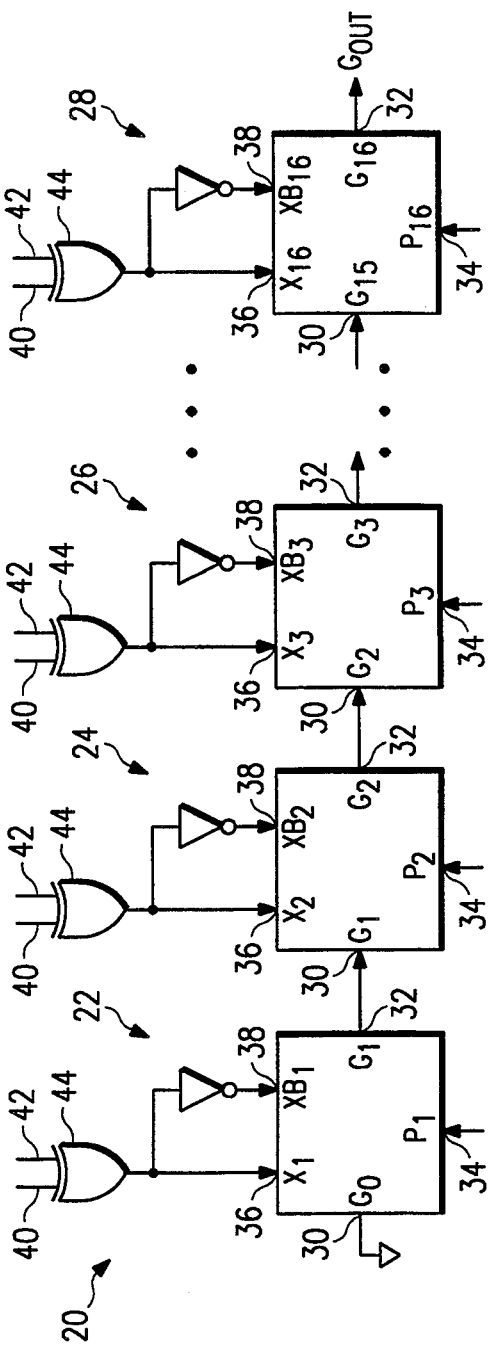
FIG. 2 is a schematic diagram of a serial magnitude comparator utilized in the prior art.

FIG. 2 shows a schematic diagram of a serial magnitude comparator 20 utilized in the prior art. The magnitude comparator 20 is responsible for determining the relationship between the magnitude of two numbers. The magnitude comparator 20 has a plurality of bit comparators 22, 24, 26, and 28 which determine the status of the relative magnitude of the two numbers being compared. The number of bit comparators needed is a function of the number of bits in the two numbers being compared. Each bit comparator compares a bit, at a certain bit position, from both numbers. For example, the magnitude status of the first bit to be compared, 40, is compared to that of the second bit 42 to determine if it is equal to, less than, or greater than the second bit 42. Every bit comparator has four inputs. The two bits to be compared, 40 and 42, are input to an exclusive OR gate 44, the output of which is input 36 of bit comparators 22, 24, 26 and 28; signal 36 is inverted to provide input 38. Input 38, which is simply the inverse of input 36, could easily be generated internal to the bit comparator, in which case it would not be an input signal. Other inputs to the bit comparators are the output of the previous bit comparator 30, and input 34, the first bit of the two bits being compared. Input 34 is different from program value 32 shown in FIG. 1. FIG. 2 shows two binary numbers being compared whereas FIG. 1 shows a binary number being compared with a fixed value represented by program value 32.

The bit comparators of FIG. 2 detect the relative magnitude of the two numbers being compared. If bits 40 and 42 are identical in magnitude, then compare output 32 is equal to compare input 30. However, if 40 and 42 are different in magnitude, compare output 32 is determined according to the design rule: If input bit 40 is greater than input bit 42, compare output 32 is equal to 1. Conversely, if input bit 40 is less than input bit 42, compare output 32 is equal to 0. Bit inputs 40 and 42 pass through an exclusive OR gate. Therefore, if bit 40 and bit 42 are the same, then input 36 will be equal to 0 and input 38, which is inverted, will be equal to 1. But, if bit 40 and bit 42 are different in magnitude, then input 36 will be equal to 1 and input 38 will be equal to 0. The truth table below shows compare output 32 in terms of inputs 36 and 38.

TABLE 1

| Input 36 | Input 38 | Output 32 |
| --- | --- | --- |
| 1 | 0 | Input 34 |
| 0 | 1 | Input 30 |

This table shows that when the two bits to be compared, 40 and 42, are different, then compare input 34 is passed out as compare output 32. Conversely, when bits 40 and 42 are the same in magnitude, the compare input from the previous bit comparator 30 is passed out as compare output 32. Compare input 30 of the initial bit comparator 22 is tied to a fixed value which can be $V_{cc}$ or ground as shown in FIG. 2. Thus, if input bits 40 and 42 are the same, then a low will be passed to the compare output 32. In turn, bit comparator 24 receives a low input signal 30 and, if input bits 40 and 42 of bit comparator 24 have the same magnitude, compare output 32 will again be 0, passing out incoming compare input 30. This process starts with the least significant bit (LSB) comparator 22 and continues serially until the most significant bit (MSB) comparator 28 has finished its compare operation. Only when the magnitudes of the MSBs have been compared will a final compare output 32 be generated. The highest order bit comparator with bit difference determines the state of the final compare output 32 of bit comparator 28.

FIG. 2 shows that sixteen bit comparators are needed to compare two sixteen bit numbers. Since the process is serial, it can be quite time consuming to wait for a final compare output. For a sixteen bit comparison, at least sixteen gate delays must be incurred before a final compare output signal is forthcoming. This is applicable to the worst case scenarios where only the LSBs differ or where all sixteen bits being compared are equal in magnitude. It is desirable to speed up this serial comparison process since many comparator applications demand high speed performance.

Figure 3:
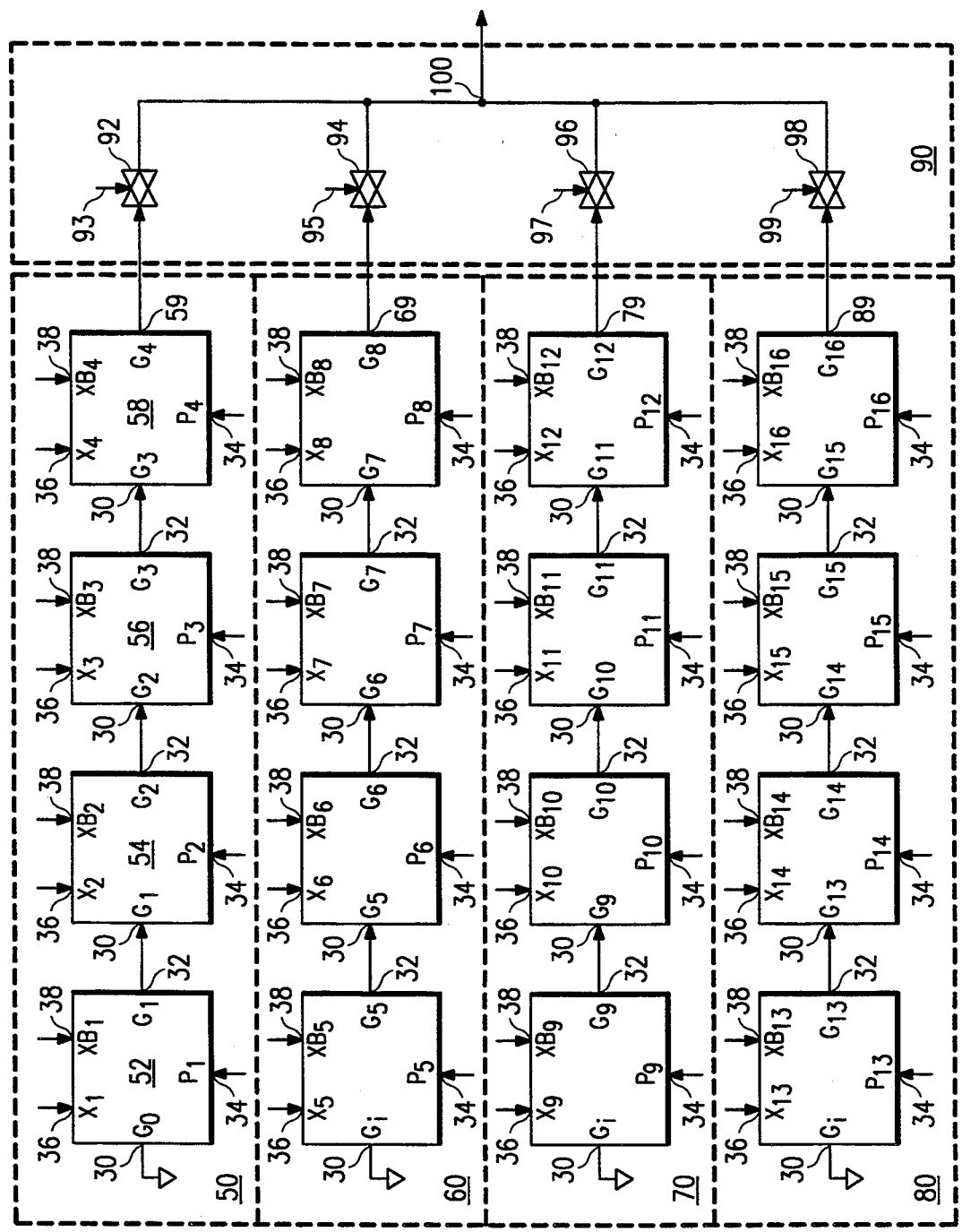
FIG. 3 is a schematic diagram of a parallel magnitude comparator according to an aspect of the present invention.

FIG. 3 shows a schematic diagram of a parallel magnitude comparator according to an aspect of the present invention. Bit comparators have the same inputs and output as shown in FIG. 2. However, FIG. 3 differs from FIG. 2 in that the bit comparators are segmented into groups which operate independently of each other in parallel. Referring to FIG. 3, the bit comparators are divided into comparator groups 50, 60, 70, and 80. The inputs and outputs of each bit comparator are equal to those shown in FIG. 2. Input 36 is determined by passing the two bits to be compared through an exclusive OR gate, and input 38 is the inverse of input 36. Input 38 is the inverse of input 36 and could, therefore, be generated internal to the bit comparator and need not be an input at all. Input 34 is equal to the first bit of the two bits being compared. Compare output 32, as in FIG. 2, is dependent on the relative magnitude of the two bits being compared.

The truth table shown above for FIG. 2 is also applicable to FIG. 3. If input bit 36 is a logic high, the two bits compared are different relative to each other, and input 34 is passed out as the compare output 32. If, however, input bit 36 is a logic low, the two bits compared have the same magnitude relative to each other, and compare input 30 is simply passed out as the compare output 32. As an example, if each of the four bit comparators 52, 54, 56, and 58 of comparator group 59 compares bits that are equal to each other, then logic low compare input 30 of initial bit comparator 52 will be passed through subsequent bit comparators 54, 56, and 58 as compare output 59 of comparator group 50. At this point, the logic low compare output signal 59 is an input to control element 90. Output compare signal 59 of the comparator group 50 is equal to compare output 32 of the bit comparator having the highest order bit difference.

In a sixteen bit example, comparator group 50 compares the magnitude of the four least significant bits (LSBs) of two numbers. Comparator groups 60 and 70 compare the magnitude of bits 5-8 and 9-12, respectively, while comparator group 80 compares the magnitude of the most significant bits (MSBs), 13-16. Comparison of these bits occurs serially within the comparator groups, with comparator groups 50, 60, 70, and 80 operating in a parallel fashion to one another. Therefore, comparison of all sixteen bits occurs in the same amount of time required to compare four bits in the serial magnitude comparator of FIG. 2. Clearly this means an increase in performance for any system using a parallel magnitude comparator. One skilled in the magnitude comparator art will recognize that breaking the bit comparators into groups of four is only one of many ways to group the bit comparators.

Compare output signals 59, 69, 79, and 89 of comparator groups 50, 60, 70, and 80, respectively, are inputs to control element 90. Only one of these compare output signals, selected by control element 90, will be passed through control element 90 as final compare output 100. Control element 90 has a plurality of transmission gates 92, 94, 96, and 98 each of which corresponds to one comparator group: 50, 60, 70, and 80, respectively. Each transmission gate has as inputs the compare output from the corresponding comparator group and an logic input determined by boolean equations. Transmission gate 92 has as its inputs compare output 59 of comparator group 50 and logic input 93. The logic inputs 93, 95, 97, and 99 ensure that only the compare output of the comparator group having the highest order bits with magnitude difference will be passed out of control element 90 as final compare output 100. If none of the bits are different, then compare output 59 of the lowest order comparator group 50 is passed through control element 90 as final compare output 100.

Logic inputs 93, 95, 97, and 99 are determined by the following equation:

$$SN_N = X_N + X_{N-1} + X_{N-3},$$

where $X_N$ is the result of exclusive ORing the two bits to be compared. Specifically, the logic inputs are as follows:

Input $99 = S_{16} = X_{16} + X_{15} + X_{14} + X_{13}$
Input $97 = \overline{S_{12}} {}^* S_{16} = (X_{12} + X_{11} + X_{10} + X_9) {}^* \overline{S_{16}}$
Input $95 = \overline{S_8} {}^* \overline{S_{12}} {}^* S_{16} = (X_8 + X_7 + X_6 + X_5) {}^* \overline{S_{12}} {}^* \overline{S_{16}}$
Input $93 = \overline{S_8} {}^* \overline{S_{12}} {}^* \overline{S_{16}}$ When one of the logic inputs 93, 95, 97, or 99 is high, its corresponding transmission gate turns on and allows the corresponding comparator groups compare output, 59, 69, 79, or 89, to pass through the transmission gate. If, however, the logic input is low, its corresponding transmission gate turns off and does not allow the corresponding compare output signal to pass through the transmission gate. These equations guarantee that the compare output of the comparator group having the highest order of bit difference is passed out as final compare output 100. For instance, if two binary numbers have unequal magnitudes for bit 14 and also for bit 2, the logic inputs ensure that compare output 89 of comparator group 80 will be passed out as final compare output 100 since bit 14 is more significant than bit 2. Determination of logic inputs 93, 95, 97, and 99 occurs at the same time comparator groups 50, 60, 70, and 80 perform magnitude compare operations. This parallel operation allows the appropriate compare output 59, 69, 79, or 89 to be selected by control element 90 and passed out as final compare output 100 immediately after the comparator groups have completed comparison operations. Control element 90 adds no delay to the parallel magnitude comparator comparison time, since control element 90 finishes its operations prior to or at the same time group compare outputs 59, 69, 79, and 89 are ready to be passed through the 12 control element 90.

The parallel magnitude comparator of FIG. 3 has 5 gate delays: one gate delay for each magnitude comparator operating serially in a comparator group, such as bit comparators 52, 54, 56, and 58 in comparator group 50, and one gate delay for control element 90. No buffering is required since the bit comparators are split into groups of four. This is a marked improvement over the serial magnitude comparator shown in FIG. 2 which results in at least 16 gate delays, one for each bit comparator. In the 16 bit example, buffering is needed to avoid the signal degradation which would occur from propagating through 16 serially connected bit comparators. The gate delay is even greater when buffering is used in the serial magnitude comparator. If an inverter were placed after every fourth bit comparator, four extra gate delays would be added for a total of 20 gate delays.

While the circuitry described in FIG. 3 is adequate for the comparison of two sixteen bit numbers, the comparison of larger numbers such as 32-bit, 64-bit and even 128-bit numbers becomes problematic. For instance, the comparison of two 64-bit numbers using the circuitry of FIG. 3 would result in numerous gate delays which could prove prohibitive in circuitry which must quickly supply a magnitude comparison. For a 64-bit number, sixteen parallel groups could be connected to sixteen transmission gates. The resulting fan-in of the input signals to the control element of FIG. 3 would be at least sixteen signals. Additionally, having a great number of magnitude comparators connected serially to each other can greatly add to the resistance and capacitance of the entire magnitude comparison operation.

Thus, the one level solution of FIG. 3 may not be feasible for the comparison of such a large number. An enhanced version of the circuitry of FIG. 3 is necessary to address problems such as excessive gate delays and problems associated with excessive loading conditions.

Figure 4:
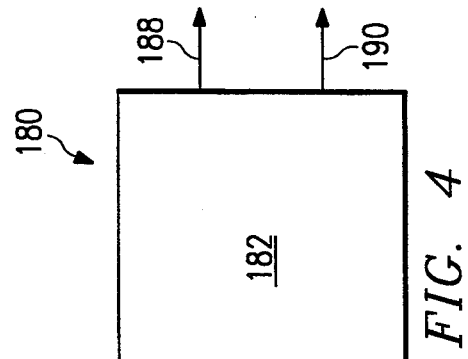
FIG. 4 is a block diagram according to an aspect of the present invention.

Referring to FIG. 4, a block diagram 180 according to an aspect of the present invention is shown. Magnitude comparator block 182 contains the parallel magnitude comparator groups of FIG. 3 and No Match circuitry. Input signals 182 and 184 represent the bits of the first and second sixteen bit number, respectively, being compared. Composite compare output signal 188 represents the overall compare output signal which results from comparing two sixteen bit numbers and is therefore equivalent to final compare output 100 of FIG. 3. Block No Match output signal 190 indicates if the two sixteen bit numbers being compared exactly match each other. The parallel magnitude comparator and No Match circuitry contained in FIG. 4 is applicable to comparing two sixteen bits numbers. However, expanded use of magnitude comparator blocks such as magnitude comparator block 182 provides for much larger numbers to be compared while minimizing gate delays.

Figure 5:
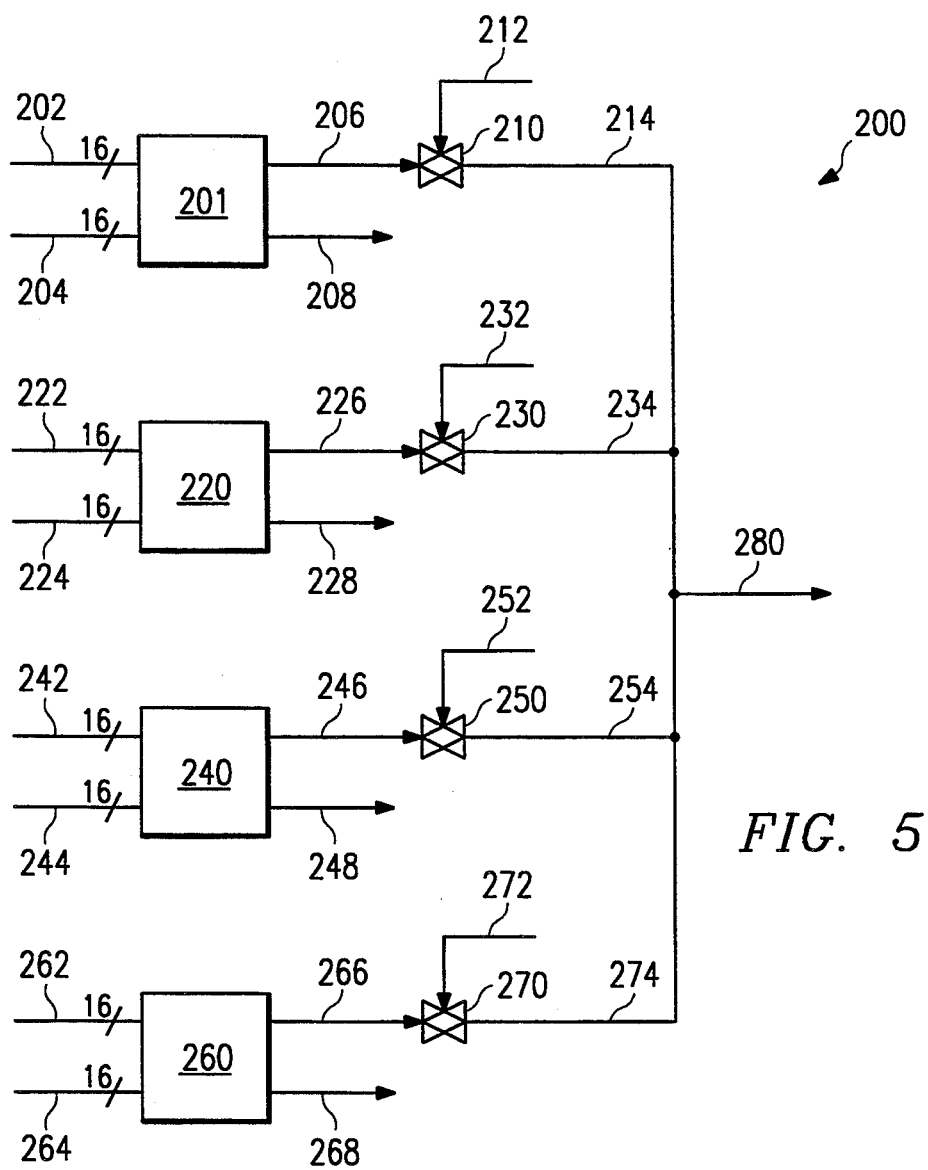
FIG. 5 is a schematic diagram of a multiple level parallel magnitude comparator according to the present invention.

Referring now to FIG. 5, a schematic diagram of a multiple level parallel magnitude comparator according to the present invention is shown. Circuitry 200 provides means for comparing the magnitude of two 64-bit numbers. Comparator blocks 201, 220, 240, and 260 are analogous to block 182 of FIG. 4 in that each contain parallel magnitude comparator and No Match circuitry. Comparator block 201 compares the 16 least significant bits of two 64-bit numbers through input signals 202 and 204. Input signal 202 represents the bits of the first number being compared while input signal 204 represents the bits of the second number being compared. Comparator block 201 has two output signals, 206 and 208, which are equivalent to output signals 188 and 190 of FIG. 4. Composite compare output signal 206 is the signal which results from comparison of the 16 LSBs of the two numbers being compared, and Block No Match output signal 208 indicates whether the two numbers being compared are exactly equal to each other. Comparator blocks 220 and 240 are similar to comparator block 201 in that they each have bit input signals, 222, 224 and 242, 244, respectively; they each generate a Composite compare output signal, 226 and 246, respectively, as well as a Block No Match output signal, 228 and 248, respectively. Comparator block 220 performs magnitude comparison and No Match generation for bits 17–32 while comparator block 240 performs the same logic for bits 33–48 of the numbers. Finally, comparator block 260 performs logic on the most significant bits (MSBs), bits 49–64, of two 64-bit numbers.

Composite compare output signals 206, 226, 246, and 266 are generated by comparator blocks 201, 220, 240, and 260, respectively, and are also inputs to transmission gates 210, 230, 250, and 270, respectively. Transmission gates 210, 230, 250, and 270 correspond to comparator blocks 201, 220, 240, and 260, respectively. Each transmission gate has two inputs; a composite compare output signal as well as a logic input signal. For instance, transmission gate 210 has composite compare signal 206 and logic signal 212 as input signals. Logic input signals 212, 232, 252, and 272 are determined by boolean equations. The logic inputs signals ensure that only the composite compare output signal of the comparator block having the highest order bits with magnitude difference is passed through as final compare output 280. To illustrate, if none of the bits of the two numbers being compared are different, then composite compare output signal 206 of the lowest order comparator block 201 is passed through its transmission gate 210 as final compare output 280. If, on the other hand, several corresponding bits of two 64-bit numbers do not match, the composite compare output signal of the comparator block having the highest order bit of difference will be passed through as final compare output 280.

Logic input signals 212, 232, 252, and 272 are dependent on the value of Block No Match output signals, 208, 228, 248, and 268, respectively. In the case of comparing two 64-bit numbers, Block No Match output signals are determined by the following equation:

$$NM_N = S_N + S_{N\text{-}4} + S_{N\text{-}8} + S_{N\text{-}12},$$

where NM represents "No Match" and $S_N$ has an equivalent meaning to the $S_N$ which is used to define logic inputs 93, 95, 97, and 99 of FIG. 3. Note that $S_{N\text{-}12}$ was not necessary in FIG. 3, but is required here. Specifically, the logic input signals are defined as follows:

Input $272 = NM_{64} = S_{64} + S_{60} + S_{56} + S_{52}$
Input $252 = \overline{NM_{48}} * NM_{64} = (S_{48} + S_{44} + S_{40} + S_{36}) * \overline{NM_{64}}$
Input $232 = NM_{32} * \overline{NM_{48}} * \overline{NM_{64}} = (S_{32} + S_{28} + S_{24} + S_{20}) * \overline{NM_{48}} * \overline{NM_{64}}$
Input $212 = \overline{NM_{32}} * \overline{NM_{48}} * \overline{NM_{64}}$ When one of the logic input signals 212, 232, 252, or 272 is a logic high, its transmission gate turns on and allows the corresponding composite compare output signal, 206, 226, 246, or 266, respectively, to pass through as final compare output 280. If, however, a logic input signal is a logic low, its transmission gate turns off and does not allow the corresponding composite compare output signal to propagate through the transmission gate. These logic input equations guarantee that the composite compare output signal of the comparator block having the highest order bit difference is passed out as final compare output 280. For instance, if two 64-bit numbers have unequal magnitudes for bits 63, bits 25, and bits 2, the logic input signals ensure that composite compare output signal 266 of the MSB compare block 260 is passed out as final compare output 280 since bit 63 is more significant than both bit 25 and bit 2.

Determination of logic signal inputs 212, 232, 252, and 272 occurs at the same time comparator blocks 201, 220, 240, and 260 perform magnitude compare operations. This parallel operation allows the appropriate composite compare output signal, 206, 226, 246, or 266, to propagate through its transmission gate as final compare output 280 immediately after the comparator blocks have completed comparison operations. Transmission gates 210, 230, 250, and 270 add little delay to the parallel magnitude comparator comparison time, since the transmission gates typically are decoded prior to the generation of the composite compare output signal from its corresponding comparator block. Thus, for the comparison of two 64-bit numbers as shown in FIG. 5, only 6 gate delays are required: 4 gate delays are incurred for each of the individual magnitude comparators connected together serially, and 2 gate delays are incurred at each of the transmission gates. This is a marked improvement over the prior art where magnitude comparators were serially connected to each other and no hierarchical grouping was employed, as is shown in FIG. 2. Equally important is that, with the multiple level parallel magnitude comparator circuitry of FIG. 5, only 1 more gate delay is incurred for comparing two 64-bit numbers than for comparing two 16-bit numbers as shown in FIG. 3!

Figure 6:
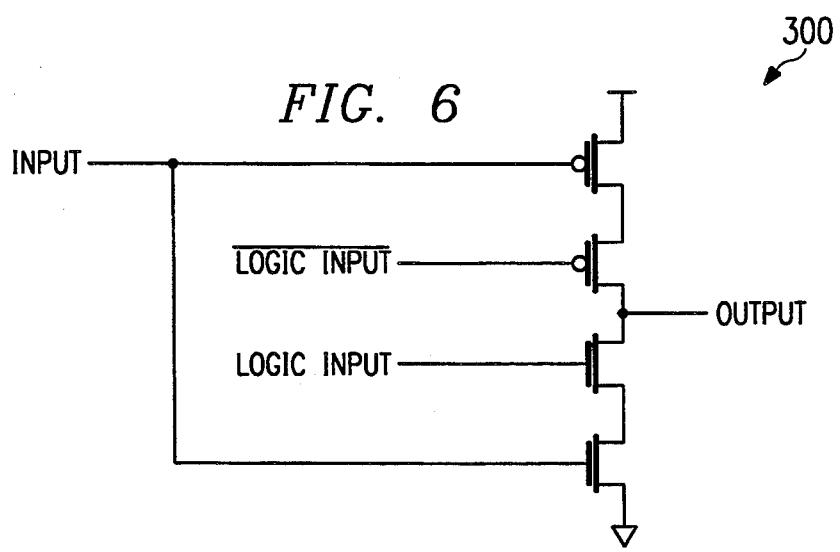
FIG. 6 is a schematic diagram of a tri-stateable gate according to the present invention.

An alternative embodiment of the invention using a tri-stateable gate rather than a transmission gate is shown in FIG. 6. FIG. 6 shows a tri-stateable gate 300 with three inputs: INPUT, LOGIC INPUT and LOGIC INPUT. INPUT is the compare output signal from the corresponding comparator group and is analogous to group compare outputs 59, 69, 79, and 89 shown in FIG. 3. LOGIC INPUT is analogous to logic inputs 93, 95, 97, and 99 of FIG. 3; LOGIC INPUT is determined by the same $S_N$ equations shown above. LOGIC INPUT is simply the inverse of LOGIC INPUT. The OUTPUT signal is determined by the state of the INPUT and LOGIC INPUT signals. When LOGIC INPUT is a logic high and LOGIC INPUT is a logic low, the INPUT signal is inverted and passed through as the OUTPUT. When LOGIC INPUT is a logic low, LOGIC INPUT is a logic high, and tri-stateable gate 300 is effectively in a high impedance state and shuts off, allowing nothing to pass.

Four tri-stateable gates 300 would take the place of the four transmission gates shown in FIG. 3 and would both multiplex and buffer in the same stage. The outputs of these four pass gates would be wired together for a single final compare output 100. In this case, buffering would still not be required for the 16 bit parallel magnitude comparator shown in FIG. 3.

The tri-stateable gate 300 of FIG. 6 has been described as an alternative to the transmission gates shown in FIG. 3. It will be clear to one skilled in the art that tristateable gate 300 is also equally well suited to be used in place of transmission gates 210, 230, 250, and 270 of FIG. 5.

The multiple level parallelized magnitude comparator has been described in relation to a FIFO flag generation circuit. The magnitude comparator can also be used in a multitude of other applications such as in arithmetic logic units (ALUs) and microprocessors of computers where it is necessary to determine the magnitude of one number relative to that of a second number. The invention is especially relevant to those applications where the magnitude of two large numbers are being compared, and it is desirable to minimize the number of gates through which a signal must propagate before a final compare output signal is generated. Video technology, image processing, and content addressable memories (CAMs) are all examples of technologies which could benefit from the described invention.

While the invention has been particularly shown and described with reference to a preferred embodiment, it will be understood by those skilled in the art that various changes in form and detail may be made therein without departing from the spirit and scope of the invention. For instance, while the number of magnitude comparators connected together serially in FIG. 3 is four, one skilled in the art will acknowledge that the number is arbitrary and could just as easily be eight. Likewise, in FIG. 5, four comparator blocks are placed in parallel to facilitate the magnitude comparison of two 64-bit numbers. Additionally, one skilled in the art will recognize that the number of comparator blocks could be changed without departing from the spirit and scope of the invention. For example, only 2 comparator blocks would be necessary to compare two 64-bit numbers if the number of magnitude comparators connected serially inside the comparator blocks increased from four to eight. And, finally, the invention may be expanded to include additional levels of gating elements in order to facilitate the magnitude comparison of even larger binary numbers.

What is claimed is:

1. A multiple level magnitude comparator, comprising:
   a plurality of comparator blocks, wherein each comparator block performs a magnitude comparison operation between consecutive bits which define a portion of a first binary value and a corresponding portion of a second binary value, and wherein each comparator block generates a composite compare output signal indicative of the result of the magnitude comparison operation and a no match output signal indicative of whether the portion of the first binary value and the corresponding portion of the second binary value exactly match; and
   a plurality of gating elements, wherein each gating element corresponds to a comparator block and has a first signal input equal to the composite compare output signal of the corresponding comparator block and a second signal input determined by whether the bits compared in the corresponding comparator block or higher order comparator blocks match.

2. The magnitude comparator of claim 1, wherein each comparator block comprises:
   a plurality of bit comparators divided into comparator groups that generate an output signal, wherein each of the comparators compares the magnitude between a first bit and a second bit; and
   a control element, having inputs connected to the outputs of the comparator groups, which selects one of the outputs of the comparator groups to be output from the control element.

3. The magnitude comparator of claim 2, wherein the no match output signal for a particular comparator block is obtained by performing logic on the consecutive bits which define a portion of the first binary value and the corresponding portion of the second binary value.

4. The magnitude comparator of claim 3, wherein the no match output signal of each comparator block is capable of controlling the gating elements.

5. The magnitude comparator of claim 1, wherein the comparator blocks and the gating elements perform their respective functions simultaneously.

6. The magnitude comparator of claim 1, having at least a first level magnitude comparator and a second level magnitude comparator, wherein the first level magnitude comparator has a plurality of comparator blocks and gating elements which are contained and duplicated within the comparator blocks of the second level magnitude comparator, which also has a plurality of comparator blocks and gating elements, such that the second level magnitude comparator is capable of comparing the magnitude of larger binary values than is the first level magnitude comparator.

7. The magnitude comparator of claim 1, wherein the gating elements determine which comparator block contains the highest order bits which do not match.

8. The magnitude comparator of claim 1, wherein each gating element receives a first and a second value input which determines whether the gating element will allow the first value input to be an output signal from the gating element.

9. The magnitude comparator of claim 8, wherein the gating element is capable of not allowing the first value input of the gating element to be output from the gating element.

10. The magnitude comparator of claim 8, wherein only one of the plurality of gating elements may allow the first value input of the gating element to be an output signal from the gating element.

11. The magnitude comparator of claim 1, wherein the gating elements are transmission gates.

12. The magnitude comparator of claim 1, wherein the gating elements are tri-stateable gates.

13. The magnitude comparator of claim 2, wherein each comparator group is independent from every other comparator group.

14. The comparator group of claim 13, wherein the comparator groups compare a plurality of bits simultaneously.

15. The comparator group of claim 13, wherein the comparator groups and the control element perform their respective functions simultaneously.

16. The magnitude comparator of claim 2, wherein each bit comparator generates a compare output which is input to the subsequent bit comparator.

17. The magnitude comparator of claim 16, wherein the initial bit comparator of the comparator group has as its compare input a signal set to a predetermined level.

18. The magnitude comparator of claim 16, wherein each bit comparator has a first value input, a second value input, and a third value input.

19. The magnitude comparator of claim 18, wherein the first value input is a one bit value determined by performing logic on the first bit and the second bit being compared, and the logic being performed determines if the two bits being compared are not equal.

20. The magnitude comparator of claim 19, wherein the second value input is equal to the value of the first bit to be compared.

21. The magnitude comparator of claim 19, wherein the first bit and the second bit to be compared are a FIFO read count and a FIFO write count, respectively.

22. The magnitude comparator of claim 18, wherein the third value input is the compare output signal generated by a previous bit comparator.

23. The magnitude comparator of claim 2, wherein the control element determines which comparator group contains the highest order bits which do not match.

24. The control element of claim 23, wherein the control element has a plurality of gates each of which corresponds to one of the comparator groups.

25. The control element of claim 24, wherein the control element has a plurality of transmission gates each of which corresponds to one of the comparator groups.

26. The control element of claim 24, wherein the control element has a plurality of tri-stateable. gates each of which corresponds to one of the comparator groups.

27. The comparator of claim 24, wherein the gate receives a first and a second value input which determines whether the gate will allow the first value input to be an output signal from the gate.

28. The gate of claim 27, wherein the first value input is the output signal from the corresponding comparator group.

29. The gate of claim 28, wherein the second value input is determined by whether the bits compared in the current comparator group or higher order comparator groups match.

30. The gate of claim 27, wherein the gate is capable of not allowing the first value input of the gate to be output from the gate.

31. The gate of claim 27, wherein only one of the plurality of gates may allow the first value input of the gate to be an output signal from the gate.

32. The control element of claim 24, wherein, for comparing the magnitude of two 64-bit numbers, there are four comparator blocks each having four comparator groups each of which has four bit comparators.

33. The control element of claim 32, wherein each of the four comparator groups corresponds to one gate.

* * * * *